United States Patent [19]

Braun

[11] Patent Number: 4,555,959
[45] Date of Patent: Dec. 3, 1985

[54] SHIFT CONTROL SYSTEM

[75] Inventor: Eugene R. Braun, Royal Oak, Mich.

[73] Assignee: Eaton Corporation, Cleveland, Ohio

[21] Appl. No.: 493,117

[22] Filed: May 9, 1983

[51] Int. Cl.$^4$ .................. F16H 3/08; B60K 20/14
[52] U.S. Cl. ................................... 74/334; 74/745; 74/335; 74/868
[58] Field of Search ............ 74/334, 331, 339, 745, 74/752 A, 752 C, 335, 867, 868, 869

[56] References Cited

U.S. PATENT DOCUMENTS

| | | | |
|---|---|---|---|
| 2,121,157 | 6/1938 | Lempereur et al. ............ | 74/334 |
| 2,519,794 | 8/1950 | Siekmann et al. ............. | 74/334 |
| 2,550,383 | 4/1951 | Selby .......................... | 74/335 |
| 2,582,895 | 1/1952 | Young ......................... | 74/745 |
| 2,637,222 | 5/1953 | Backus ........................ | 74/745 |
| 2,640,374 | 6/1953 | Willis ......................... | 74/745 |
| 2,654,268 | 10/1953 | Perkins ....................... | 74/745 |
| 2,763,290 | 9/1956 | Perkins et al. ............... | 74/745 |
| 2,778,247 | 1/1957 | Perkins ....................... | 74/745 |
| 2,932,988 | 4/1960 | Flynn et al. .................. | 74/745 |
| 3,011,357 | 12/1961 | Binder ........................ | 74/334 |
| 3,105,395 | 10/1963 | Perkins ....................... | 74/745 |
| 3,116,645 | 1/1964 | Johnson ....................... | 74/334 |
| 3,229,551 | 1/1966 | Stuckey ....................... | 74/745 |
| 3,648,546 | 3/1972 | McNamara et al. ............ | 74/745 |
| 3,799,002 | 3/1974 | Richards ...................... | 74/745 |
| 3,921,469 | 11/1975 | Richards ...................... | 74/339 |
| 3,937,108 | 2/1976 | Will ........................... | 74/869 |
| 3,983,979 | 10/1976 | Richards ...................... | 74/339 |
| 4,194,410 | 3/1980 | Richards ...................... | 74/339 |
| 4,388,843 | 6/1983 | Teeter ......................... | 74/745 |
| 4,440,037 | 4/1984 | Foxton et al. ................. | 74/745 |
| 4,476,748 | 10/1984 | Morscheck .................... | 74/869 |

FOREIGN PATENT DOCUMENTS 0037197 10/1981 European Pat. Off. ............ 74/745

Primary Examiner—Rodney H. Bonck
Assistant Examiner—David Novais
Attorney, Agent, or Firm—C. H. Grace; H. D. Gorcon

[57] ABSTRACT

A control system (158) for a multi-speed change gear transmission (10) of the type permitting preselection of a selected engaged gear ratio is provided. The control system includes an operator actuated selector switch (160) for selection of a desired gear ratio and providing a signal (R,F) indicative thereof, and actuation devices (166, 168, 152) for shifting the transmission into the selected gear ratio in response to said signals. Preselect prohibit valves (162, 164) are interposed the selector switch and actuation devices to block the transmittal of said signals and to maintain the transmission in the currently engaged gear ratio until operator actuation of a prohibit release switch (172) provides a signal (C) indicating operator request for execution of the preselected gear change.

10 Claims, 5 Drawing Figures

Fig. 5

| PROHIBIT CONTROL | SELECTOR POSITION | SELECTED SHIFTER POSITION | R | F | C | D | G | 1 | 2 | 3 | ACTUAL POSITION (AFTER TORQUE BREAK) |
|---|---|---|---|---|---|---|---|---|---|---|---|
| CLUTCH STROKED | INT TO LOW | LOW | P | EX | P | P | EX | P | P | EX | LOW |
| | HIGH TO LOW | LOW | P | EX | P | P | EX | P | P | EX | LOW |
| | LOW | LOW | P | EX | P | P | EX | P | P | EX | LOW |
| CLUTCH NOT STROKED | INT TO LOW | LOW | P | EX | EX | EX | EX | P | EX | EX | INT |
| | HIGH TO LOW | LOW | P | EX | EX | EX | P | P | EX | P | HIGH |
| | LOW | LOW | P | EX | EX | P | EX | P | P | EX | LOW |
| CLUTCH STROKED | LOW TO INT | INT | EX | EX | P | EX | EX | P | EX | EX | INT |
| | HIGH TO INT | INT | EX | EX | P | EX | EX | P | EX | EX | INT |
| | INT | INT | EX | EX | P | EX | EX | P | EX | EX | INT |
| CLUTCH NOT STROKED | LOW TO INT | INT | EX | EX | EX | P | EX | P | P | EX | LOW |
| | HIGH TO INT | INT | EX | EX | EX | EX | P | P | EX | P | HIGH |
| | INT | INT | EX | EX | EX | EX | EX | P | EX | EX | INT |
| CLUTCH STROKED | LOW TO HIGH | HIGH | EX | P | P | EX | P | P | EX | P | HIGH |
| | INT TO HIGH | HIGH | EX | P | P | EX | P | P | EX | P | HIGH |
| | HIGH | HIGH | EX | P | P | EX | P | P | EX | P | HIGH |
| CLUTCH NOT STROKED | LOW TO HIGH | HIGH | EX | P | EX | P | EX | P | P | EX | LOW |
| | INT TO HIGH | HIGH | EX | P | EX | EX | EX | P | EX | EX | INT |
| | HIGH | HIGH | EX | P | EX | EX | P | P | EX | P | HIGH |

SHIFT CONTROL SYSTEM

BACKGROUND OF THE INVENTION

1. Field of the Invention

This invention relates to a shift control system for a change gear transmission and in particular relates to a shift control system for a change gear transmission permitting preselection of a shift or gear change which shift or gear change will be executed upon achievement of enabling conditions, such as a torque break permitting disengagement of the previously engaged gear and achieving synchronization for substantial synchronization of the clutch members of the selected gear. More particularly, the present invention relates to a shift control system of the preselection type including a prohibit means prohibiting execution of the preselected gear change until the operator signals the prohibit means, by acutation of a prohibit release means, that execution of the preselected gear change is presently desired.

2. Description of the Prior Art

Compound transmissions of the splitter or range type, or a combination thereof, are well known in the prior art as may be seen by reference to U.S. Pat. Nos. 3,105,395; 3,648,546; 3,799,002; 2,932,988 and 3,229,551, all of which are hereby incorporated by reference. The main section of such transmissions are typically controlled by the operator by means of a shift lever operating directly upon shift rails or by electric and/or pneumatic means, and the auxiliary section is typically shifted by means of a control lever or button located on or ad3acent the shift lever for operating the remote auxiliary shift mechanisms either pneumatically, hydraulically and/or electrically. Examples of such shift control systems for compound transmissions are well known in the prior art and examples thereof may be appreciated in greater detail by reference to U.S. Pat. Nos. 2,637,222; 2,763,290; 3,648,546; 3,799,002; 3,921,469; 3,983,979 and 4,194,410, the disclosures of which are all hereby incorporated by reference.

Blocked change gear transmissions of both the single and compound types are also well known in the prior art as may be seen by reference to above mentioned U.S. Pat. Nos. 3,799,002; 3,921,469; 3,983,979 and 4,194,410. Blocked transmissions of this type typically utilize jaw clutch assemblies which may be axially shifted against a resilient bias for positive clutch engagement upon the sensing of a synchronous or substantially synchronous rotation therebetween. The structure and function of the resiliently biasable jaw clutch assemblies and of the blockers carried thereby are well known in the prior art and form no part of the present invention.

The prior art shift control systems of the preselectable type for change gear transmissions are highly advantageous as they permit the operator to preselect a gear change which gear change will be executed upon subsequent achievement of certain operating conditions, such as a break in the torque allowing disengagement of the previously engaged gear and achievement of substantially synchronous rotation of the jaw clutch members associated with the selected gear. However, under certain situations, the prior art shift control systems of the preselection type have been undesirable in situations wherein a gear change is preselected and the required operating conditions are not achieved for a relatively long period of time allowing the operator to forget that such a preselection has occurred which may result in an unexpected gear change being executed upon later achieving of such required operating conditions. By way of example, if an operator preselects a gear change and road conditions change to the extent that he does not break the torque in the system by depressing the clutch or releasing the throttle, execution of the preselected gear change at a later time may be unexpected to the operator. This situation is more likely to occur when the preselected gear change is an auxiliary section gear change achieved by mere movement of a selector lever on the shift knob rather than if the preselected gear change is a main section gear change requiring movement of the gear shift lever itself.

SUMMARY OF THE INVENTION

In accordance with the present invention, the drawbacks of the prior art have been overcome or minimized by the provision of a shift control system of the preselect type including a prohibiting means which will prohibit execution of the preselected gear change in the absence of a prohibit means release signal from an operator actuated prohibit release means switch.

The above is accomplished by providing a master shift selector means, such as a button or lever located on a shift lever of a transmission, by which a shift may be preselected and a prohibit means blocking communication between the remote slave shifting mechanism and the master control which prohibit means will establish communication between the master control and the slave actuator in response to receipt of a prohibit means release signal from an operator actuated prohibit means release switch. Preferably, the shift control system will be a pneumatically or hydraulically operated auxiliary section control system, the prohibit means will be a valve normally blocking communication between the master control unit and the slave actuation means which valve will establish communication therebetween upon receipt of the prohibit means release signal from the prohibit means release switch which may be a button, lever or switch preferably actuated by driver partial stroking of the master clutch pedal.

Accordingly, it is an object of the present invention to provide a new and improved shift control system of the preselect type.

A further object of the present invention is to provide a new and improved shift control system of the preselect type having means for prohibiting execution of the preselected gear change in the absence of a prohibit means release signal from an operator actuated prohibit means release switch.

These and other objects and advantages of the present invention will become apparent from a reading of the detailed description of the preferred embodiment taken in view of the accompanying drawings.

DESCRIPTION OF THE DRAWINGS

FIG. 5 is a chart, or truth table, for the shift control system of FIG. 1.

DESCRIPTION OF THE PREFERRED EMBODIMENT

Figure 1:
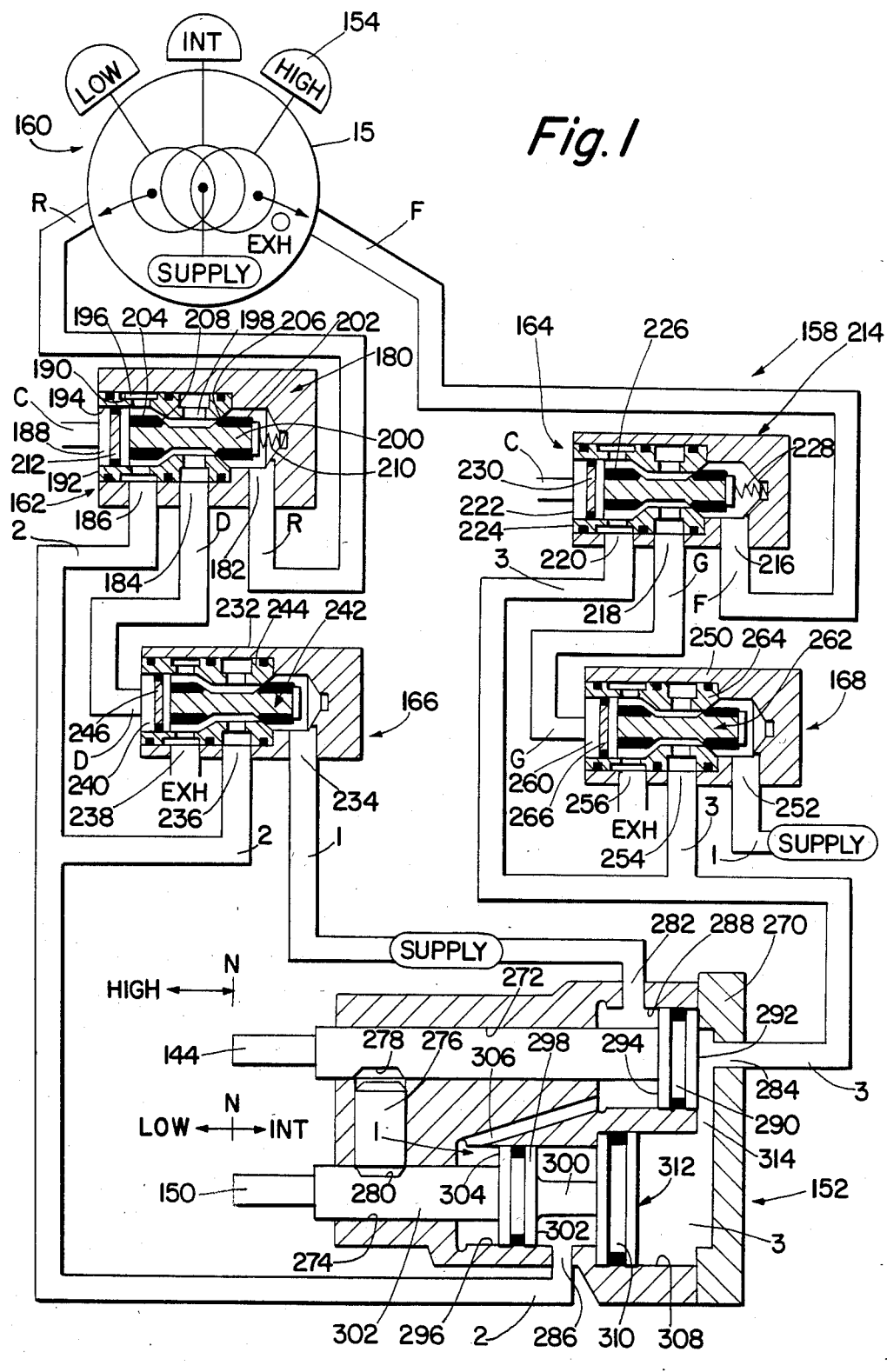
FIG. 1 is a schematic illustration of the shift control system of the present invention.

Certain terminology will be used in the following description for convenience in reference only and will not be limiting. The words "upwardly," "downwardly," "rightwardly" and "leftwardly," will designate directions in the drawings to which reference is made. The words "forward" and "rearward" will refer respectively to the front and rear ends of the transmission as same is conventionally mounted in the vehicle. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps or subdivisions of the gear ratio selected in the main transmission portion. In a splitter type compound transmission, the main transmission section is typically provided with relatively wide steps which are split or subdivided by the auxiliary section.

The term "blocked transmission" or "blocked transmission section" shall designate a change gear transmission or transmission section wherein a selected gear is non-rotatably coupled to a shaft by means of a selectively engagable positive clutch and a blocker is utilized to prevent such engagement until the members of the positive clutch are at substantially synchronous, such synchronous condition achieved by manual and/or automatic manipulation of the transmission input and/or output shafts to cause a crossing of synchronous condition therebetween but not achieved by frictional contact of the selected clutch members sufficient to cause one of the clutch members, and the apparatus associated therewith, to rotate with the other clutch member. Both the construction and operation of the blockers and blocked transmissions utilizing same has been set forth and claimed in above-mentioned U.S. Pat. Nos. 3,799,002; 3,921,469; 3,983,979 and 4,194,410 and reference is therefore made thereto for such details.

Figure 2:
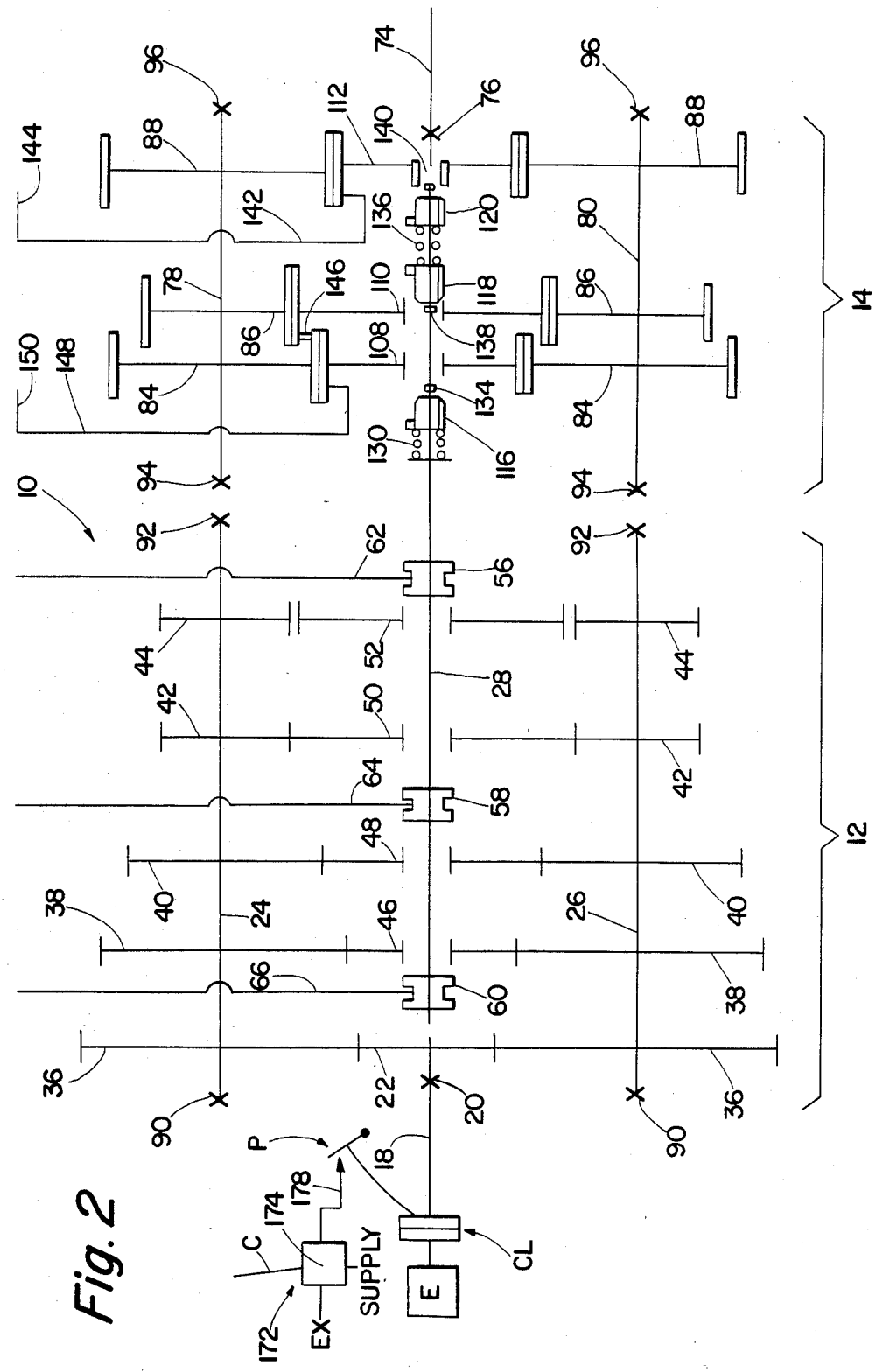
FIG. 2 is a schematic illustration of a compound transmission of the type controlled by the shift control system of FIG. 1.
Figure 3:
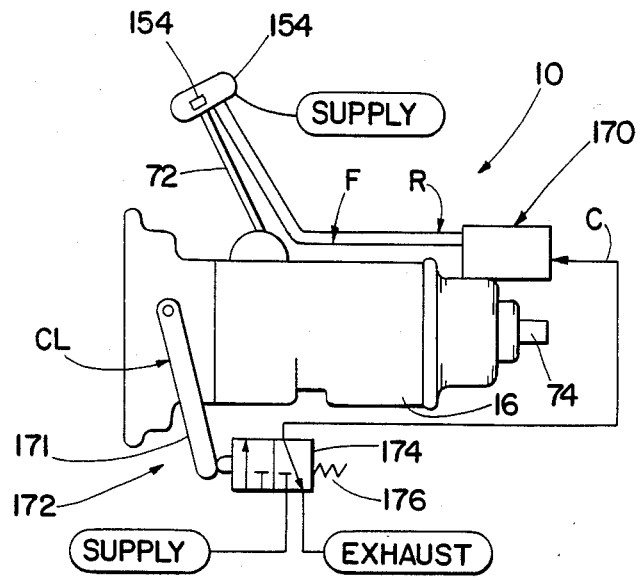
FIG. 3 is a plan view of the transmission illustrated in FIG. 2

Referring now to FIGS. 2 and 3, there is illustrated a "4×3", twelve forward speed, semi-blocked, splitter type, compound transmission 10. Transmission 10 comprises a main section 12 connected in series with an auxiliary section 14, each of which have a plurality of selectable speeds, or power paths. The main and auxiliary sections are both suitably enclosed by a conventional housing means 16.

The transmission 10 includes an input shaft 18 supported adjacent its forward end by bearing 20 and is provided with an input gear 22 non-rotatably connected thereto, as by splines. The input gear 22 simultaneously drives a pair of main section countershafts at equal rotational speed. In the illustrated embodiment, the transmission is provided with two main section countershafts, 24 and 26, disposed on diametrically opposite sides of the mainshaft 28, which mainshaft is coaxially aligned with input shaft 18 and is provided with a pilot portion at its forward end rotatably received with and supported by the rearward end of input shaft 18.

The input shaft 18 is normally driven in one direction only by a prime mover, such as a throttle controlled Diesel engine E through a selectively operated, normally engaged, friction master clutch CL. Clutch CL may be selectively disengaged by use of a pedal P as is known in the art.

Compound transmissions, especially of the splitter type, are usually designated by an "A×B" notation wherein;

"A" equals the number of selectable forward speeds or power paths in the main transmission section;

"B" equals the number of selectable speeds or power paths in the auxiliary transmission section; and "A×B" equals the number of available forward transmissions speeds.

Each of the main section countershafts 24 and 26 is provided with an identical grouping of countershaft gears, 36, 38, 40, 42 and 44 thereon, which groupings form a pair of gears, such as a pair of gears 36, of identical size and number of teeth and disposed on diametrically opposite sides of the mainshaft 28. A pluraliy of main section mainshaft gears 46, 48, 50 and 52 surround the mainshaft 28 and are slidably clutchable thereto, one at a time, by sliding clutch collars as is well known in the art.

The main section mainshaft gears 46, 48 and 50 encircle the mainshaft 28, are in continuous meshing engagement with, and are floatingly supported by, the diametrically opposite pairs of countershaft gears, 38, 40 and 42, respectively, which mounting means and the special advantages resulting therefrom are explained in greater detail in U.S. Pat. Nos. 3,105,395 and 3,335,616, both assigned to the assignee of this application and both incorporated by reference. The mainshaft gear 52 is the reverse gear and is in continous meshing engagement with a pair of countershaft gears 44 by means of conventional intermediate idler gears (not shown). The forward most countershaft gears 36 are continuously meshed with and driven by the input gear 22 for causing simultaneous rotation of the countershaft 24 and 26 whenever the input shaft is rotatably driven.

The main section mainshaft gears 46, 48, 50 and 52, and main section countershaft gears 36, 38, 40, 42 and 44, and the idler gears, are all continuously meshed with and driven by the input gear 22 and thus, in combination, form the input gearing of the transmission 10.

Sliding clutch collars 56, 58 and 60 are splined to mainshaft 28 for axial movement relative thereto and rotation therewith as is well known in the art. Sliding clutch 56 is axially slidable by means of shift fork 62 to clutch gear 52 to the mainshaft. Sliding clutch 58 is axially slidable by means of shift fork 64 to clutch either gear 50 or 48 to the mainshaft. Sliding clutch 60 is axially slidable by means of shift fork 66 to clutch gear 46 to the mainshaft or to clutch the input gear 22 (and thus the input shaft 18) to the mainshaft. Shift forks 62, 64 and 66 are attached to shift bars, or shift rails (not shown) of a known shift bar housing assembly which is operated by a conventional shift lever 72. It is understood that shift lever 72 may directly act upon the shift rails, may act upon the shift rails by means of a remote control linkage or may actuate valve means. The present invention is also applicable to transmissions utilizing a remote mechanical, electrical or fluid shift mechanism in place of a shift bar housing and conventional shift lever.

Considering now the splitter auxiliary section 14, the mainshaft 28 extends thereinto and is coaxially arranged with and piloted into an output shaft 74 which is in turn supported within the housing 16 by suitable bearings indicated at 76. The auxiliary section further includes a plurality of auxiliary section countershafts 78 and 80 each having an identical grouping of countershaft gears 84, 86 and 88 thereon. As is known in the art and illustrated in the above-mentioned U.S. Pat. No. 3,105,395, to minimize the axial and transverse dimension of a twin countershaft type transmission, the main section countershafts 24 and 26 are displaced about 40 to 90 degrees from the auxiliary section countershafts. Main section countershafts are supported in the housing 16 by bearings 90 and 92 while auxiliary section countershafts, 78 and 80, are supported in housing 16 by bearings 94 and 96.

Two auxiliary section mainshaft gears, 108 and 110 encircle the mainshaft 28 and are constantly meshed with and floatingly supported by the auxiliary countershaft gear pairs 84 and 86, respectively. Output gear 112 is splined to output shaft 74 for axial movement relative thereto in rotational movement therewith. Output gear 112 is constantly meshed with auxiliary countershaft gear pair 88.

Resiliently biased clutch members 116, 118 and 120 are splined to mainshaft 28 and, in combination with blockers (not shown) provide resilient, blocked clutching apparatus the type described in above mentioned U.S. Pat. Nos. 3,799,002; 3,921,469 and 3,924,484 for selectively clutching gears 108, 110 and 112, respectively, one at a time, to mainshaft 28. Clutch 116 is resiliently biased axially by spring 130 and limited in its axial movement by positive stop 134. Clutch members 118 and 120 are biased axially apart by spring 136 surrounding the mainshaft and limited in axial movement by stops 138 and 140.

Gear 112 is axially moved by shift fork 142 which is axially movable by a shift piston 144. Auxiliary mainshaft gears 108 an 110 are joined for joint axial movement and independent rotation by ring 146 and are axially movable by shift fork 148 axially moved by shift piston 150. Shift pistons 144 and 150 are contained in a remote auxiliary section shift valve assembly 152 to be described in greater detail below, by which gears 108, 110 or 112 are selectively engaged, one at a time, to mainshaft 28. Engagement of gear 108 to mainshaft 28 defines the low speed or greatest gear reduction power path of auxiliary section 14. Engagement of gear 110 to mainshaft 28 defines the intermediate speed for intermediate gear reduction power path of auxiliary section 14. Of course, engagement of gear 112 to mainshaft 28 is effective to couple mainshaft 28 directly to the output shaft 74 and defines the high speed or direct drive power path of auxiliary section 14.

Control of auxiliary section shift valve assembly 152, illustrated in FIG. 1 is by an operator controlled selector means, such as selector lever 154 attached to gear shift lever 72 at the gear shift knob 156. Typically, master control selector switch 154 will be a button, or toggle lever, having three unique positions ("Low", "Int", and "High") by which any one of the auxiliary section power paths or speeds may be preselected.

Preferably, the blockers utilized in transmission 10, and the other clutch elements of a given clutchable pair of clutch members, are provided with complementary angled ramps on the blocker teeth or members thereof and tend to, under the influence of the spring bias, cause an unblocking when the mainshaft is otherwise unconnected to any of the mainshaft gears and hence is at a minimum inertia. The angling of the blocker teeth is, however, insufficient to effect unblocking during a normal shift and hence will not interfere with the required blocking function thereof during a normal shift It has been found that complementary ramp angles of about 15 degrees to 25 degrees, preferably about 20 degrees, provides satisfactory operation when used in connection with normally encountered spring forces and clutch inertias By use of shift control lever 154 a shift or gear change in the auxiliary section 14 of transmission 10 may be preselected by the operator by simply moving the lever 154 to the desired selection position The selected gear change or shift will then be fully executed at such time as enabling conditions, such as a break in torque transmitted by the transmission permitting the currently engaged gear to be disengaged and a substantial synchronization of the selected gear positive clutch members, occurs. As will be described in greater detail below, a preselect prohibiting means is interposed between the master control lever 154 and the auxiliary section shift valve assembly 152 to minimize the possibility that execution of a preselected gear change in the auxiliary section will unexpectedly occur.

It is understood that although the shift control system of the present invention is particularly advantageous in association with transmissions of the compound splitter type utilizing blocked clutch assemblies in at least the auxiliary section thereof, the shift control system of the present invention is also applicable to any other change gear transmission structure allowing preselection of a gear change or shift thereof.

Figure 4:
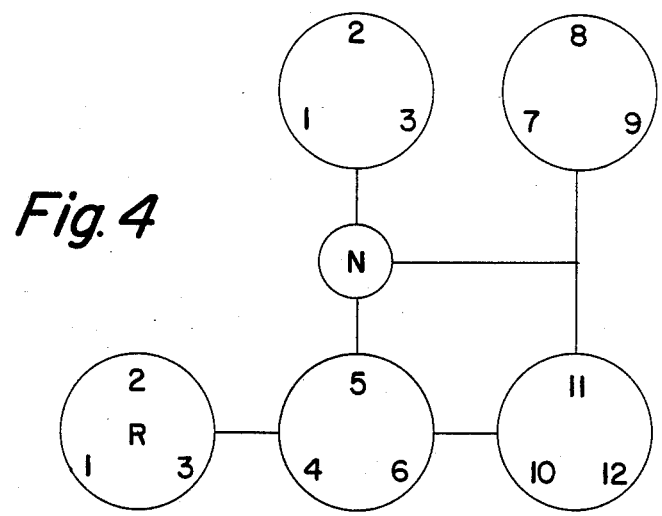
FIG. 4 is a schematic illustration of the shift pattern of the transmission of FIGS. 2 and 3.

The shift pattern for the 4×3, twelve forward speed, compound splitter type transmission 10 of the present invention may be seen by reference to FIG. 4.

The shift control system 158 may be schematically seen by reference to FIG. 1 and the truth table therefor may be seen by reference to FIG. 5. The shift control system 158 for shifting the auxiliary section 14 of transmission 10 comprises the master selector valve assembly 160 which is encased within shift lever knob 156, preselect prohibit valves 162 and 164, shift control preselect valves 166 and 168 and auxiliary section shift assembly 152. Valves 162, 164, 166 168 and actuator 152 may be formed separately or may be provided in an integral auxiliary section valve assembly block 170 as seen in FIG. 3.

Valves 166, 168 and actuator 152 may be considered the slaved actuator portion of system 158, valve 160 the master selector valve portion of system 158 and prohibit valves 162 and 164 as interposed between the above portions for selectively blocking or establishing communication therebetween.

The control system 158 of the present invention also includes an operator actuated preselect prohibit release switch mechanism 172 which may be schematically seen by reference to FIGS. 2 and 3. Briefly, mechanism 172 includes a switch operated valve 174 interposed between a supply of pressurized air and a pressure line or conduit C which communicates with valve block 170. Valve 174 is biased by spring 176 to exhaust line C and upon movement of the switch 178, preferably connected to the clutch operating linkage, block the exhaust port and connect line C to the supply of pressurized air. Preferably, a slight depression of the clutch pedal P is sufficient to actuate switch 178.

Shift selector valve 160 is an operator actuated selection mechanism having a button or toggle switch member 154 movable to one of three selectable positions, herein illustrated as "Low", "Int" and "High", corresponding respectively to selectable low, intermediate and high speed power paths of the auxiliary transmission section 14. Valve 160 is connected to the supply of pressurized air, preferably a filtered, regulated connection to a truck air supply system. In the "Low" position of selector member 154, valve 160 will connect the supply of air to a signal line R and connect signal line F to exhaust In the "Int" position of selector member 154 valve 160 will connect lines R and F to exhaust and block the supply line. In the "High" position of selector member 154, valve 160 will connect line F to the supply of pressurized fluid and will connect signal line R to exhaust. The specific structure of valve 160, and alternate valve structures suitable of performing substantially the same function, are well known in the prior art and such structures form no part of the present invention.

Preselect prohibit valve 162 is a three way-two position pilot operated valve. Briefly, valve 162 comprises a valve block 180 having a first inlet port 182 for connection to signal line R, a second port 184 for connection to preselect pilot line D, a third port 186 for connection to pressure line 2 and a fourth port 188 for connection to prohibit release line C discussed above. Valve body 180 defines an inner bore 190 in which is non-movably received a sleeve member 192. Sleeve member 192 includes a central bore portion 194 having axially extending passages 196 and 198 communicating the central bore 194 with openings 186 and 184 in the valve body. Port 182 of the valve body communicates with the central bore 194 through the righthand end thereof A slidable spool member 200 is received within the bore 194 of sleeve 192. Spool member 200 carries a righthand tapered sealing member 202 and a lefthand sealing member 204 for sealing engagement with complementary angled sealing surfaces 206 and 208, respectively formed in the sleeve 192. The slidable piston member 212 is sealingly and slidably received at the lefthand end of inner bore 194 of sleeve 192 and is acted upon by the pressure in prohibit release line C to urge spool member 200 to the right wherein sealing surfaces 204 and 208 will be sealingly engaged blocking communication between line D and line 2 and sealing surfaces 202 and 206 will disengage communicating line R and line D. It is noted that the surface area of piston 212 is considerably greater than the surface area of the sealing surfaces and thus pressurization of line C is sufficient to overcome any surface pressures which may exist at the sealing surfaces.

Preselect prohibitor valve 164 is of the same or substantially the same function and structure as preselect prohibitor valve 162. Valve 164 is a three way, two position, pilot pressure operated valve. Valve 164 includes a valve body 214 having ports 216, 218, 220 and 222 connected to lines F, G, 3 and C respectively. A sleeve 224 contains a slidable valve spool member 226 which in its leftward most position is effective to block communication between line F and line G and establish communication between line G and line 3. A piston member 230 slidably and sealingly received in sleeve 224 is exposed to pressure on line C and is effective to bias piston 226 to the right to establish communication between line F and line G and blocked communication between line G and line 3.

It is understood of course, that valves 162 and 164 are of a known construction and that valves of similar construction may be utilized to provide substantially the identical function and that the specific structure of valves 162 and 164 forms no part of the present invention.

Shift control or preselect valve 166 is a three way-two position valve of substantially identical construction as valves 162 and 164 described above. It is noted, however, that valve 166, and 168 to be described below, and/or valves 162 and 164, may utilize a biasing spring if desired. Valve 166 comprises a valve body 232 having a supply line port 234, a pressure line port 236, an exhaust port 238, and a preselect pilot port 240 connected to lines 1, 2, exhaust and D respectively. Line 1 is connected to the source or supply of pressurized fluid and the exhaust line is connected to an exhaust A valve spool 242 slidably is received within a sleeve 244 and in its leftward most position will block line 1 from line 2 and establish communication between line 2 and the exhaust and in its rightward most position will establish communication between line 1 and line 2 and block line 2 from exhaust thereby pressurizing line 2. A piston member 246 is slidably and sealingly received within sleeve 244 and is exposed to pressure from preselect pilot line D to bias spool 242 to the right.

Shift control valve 168 is identical or substantially identical to shift control valve 166 and includes a valve body 250 having ports 252, 254, 256 and 260 for connection to lines 1, 3, exhaust, and G respectively. The valve spool 262 is slidable within a sleeve 264 and in its leftward most position will block communication between line 1 and line 3 and establish communication between line 3 and the exhaust. Spool 262 in its rightward most postion will establish communication between line 1 and line 3 and block communication between line 3 and the exhaust line thereby pressurizing line 3. A piston member 266 is slidably and sealing received within sleeve 264 and exposed to pressure in line G to bias spool 262 to its rightward most position. As with valves 162 and 164 above, the specific structure of valves 166 and 168 is known in the prior art and valves of this structure, or differing structures capable of substantially identical function, are known and the specific structure thereof forms no part of the present invention.

Shift actuator assembly 152 comprises a valve body or block 270 defining two substantially parallel bores 272 and 274 in which are slidably received shift actuator pistons 144 and 150, respectively. An interlock mechanism or link 276 cooperates with notches 278 and 280 in the shift pistons to assure that not more than one of the pistons 144 and 150 may be moved from the neutral positions thereof at a time. Interlock member 276 will thus assure that only one of the auxiliary section mainshaft gears 108, 110 or 112 may be engaged at a time. Interlock structures of this type are well known in the prior art.

Valve body 270 is provided with ports 282, 284 and 286 for connection to pressure lines 1, 3 and 2, respectively. Port 282 communicates with an enlarged diameter or cylinder portion 288 of bore 272 in which a piston portion 290 of shift piston 144 is slidably and sealingly received. Piston portion 290 presents a relatively larger area surface 292 on the righthand end thereof and a relatively smaller area surface 294 on the lefthand surface thereof. The lefthand surface 294 of piston portion 290 is exposed to the constant supply pressure in line 1 to bias piston 144 rightwardly to the neutral position as shown. The righthand surface 292 of piston portion 290 is exposed to pressure in line 3. As the surface area 292 exposed to pressure in line 3 is greater that the surface area 294 exposed to pressure in line 1, when both lines 1 and 3 are pressurized, piston 144 will be urged to the left to the "High" position as shown.

Bore 274 is provided with a first enlarged diameter section 296 in which piston portion 298 of shift piston 150 is slidably and sealingly received. A reduced diameter stem portion 300 having a smaller diameter than portion 302 of piston member 150 extends rightwardly from piston portion 298. Accordingly, piston portion 298 presents a relatively larger surface area 302 on the righthand surface thereof and a relatively smaller surface area surface 304 on the left hand face thereof. The relatively larger surface area 302 of piston portion 298 is exposed to constant fluid pressure in line 2 while the relatively smaller surface area surface 304 of piston portion 298 is exposed to fluid pressure in line 1 via passage 306. Accordingly, when both lines 1 and 2 are pressurized, piston 150 will be moved leftwardly to the "Low" position.

Bore 274 presents a further enlarged diameter portion or cylinder 308 in which a disc like piston member 310 is slidably and sealingly received. Piston 310 and piston 150 are independently axially movable. Piston member 310 in its leftward most position as determined by the shoulder between cylinders 296 and 308 will abut projecton 300 of piston 150 to urge same to the neutral position as shown. As may be seen, the surface area 312 of piston 310 facing rightwardly is considerably greater than surface area 304 and thus surface area 312, which is exposed to pressure in line 3 via passage 314, will urge piston 150 leftwardly to the neutral position only when both lines 3 and 1 are pressurized as the leftward movement of piston member 310 is limited by the shoulder between cylinder portion 296 and 308.

In operation, as may be seen by reference to FIGS. 2 and 5, pressure line 1 is constantly pressurized from the source of pressurized fluid and pressure lines 2 and 3 are selectively pressurized, one at a time, to achieve high or low speed operation of auxiliary transmission section 14. To achieve low speed operation of transmission 14, line 2 is pressurized urging piston 150 and shift fork 148 carried thereby leftwardly. To achieve intermediate speed operation of auxiliary section 14, pressure lines 2 and 3 are exhausted to urge piston 150 and shift fork 148 carried thereby rightwardly. To achieve high speed operation of auxiliary section 14, pressure line 3 is pressurized and pressure line 2 is exhausted to center piston 150 and shift fork 148 carried thereby in the neutral position as shown in FIG. 1 and to urge piston 144 and shift fork 142 carried thereby leftwardly.

Pressurization of line 2 to achieve low speed operation of auxiliary transmission section 14 occurs at preselect valve 166 which is effective to connect pressurized line 2 to constantly pressurized line 1 or to vent pressurized line 2 to exhaust. Preselect valve 166 is controlled by preselect prohibit valve 162 by means of pilot line D. Pressurization of pilot line D is effective to cause preselect valve 166 to connect pressure line 2 to pressure line 1 and to block the exhaust. Preselect valve 162 is biased to connect pilot line D to line 2 and upon receipt of a signal from the preselect prohibit release switch in the form of pressurization on release line C to connect line R to line D and to block line 2 from line D. Accordingly, line D will be pressurized at preselect prohibit valve 162 upon the occurence of a pressurization of line R by movement of the selector switch 154 to the "Low" position in the selector valve 160 and actuation of the preselect prohibit release switch 178. Once pressurized, line 2 will remain pressurized in the absence of a signal on line C as preselect prohibit valve 162 is biased to establish fluid communication between lines 2 and D and line D is in the pressurized condition from line 1 through preselect valve 166. Accordingly, once placed in the low speed operation, auxiliary transmission section 14 will remain in the low speed condition regardless of the position of selector switch 154 until the preselect prohibit release valve 172 is actuated.

To place the auxiliary transmission section 14 in the intermediate speed condition from either the high or low speed condition thereof, it is necessary to exhaust line 2 or 3. This is achieved by moving selector button 154 to the intermediate position which will exhaust both signal lines R and F and block the supply line at selector valve 160 which will not depressurize the pressurized one of lines 2 or 3 until the preselect prohibit release switch is actuated. Upon actuation of the preselect prohibit release switch, line C will be pressurized and preselect prohibit valve 162 and 164 will connect line R to line D and line F to line G thereby venting line D and line G at the preselect prohibit valves 162 and 164, respectively, and through the selector valve 160, which will exhaust line 2 and line 3 at the preselect valves 166 and 168, respectively. Once lines 2 and 3 are exhausted, they will remain in the exhausted condition regardless of position of selector button 154 until the preselect prohibit release switch is actuated with the selector button 154 moved to either the "Low" or "High" positions thereof.

To select high speed operation of auxiliary transmission section 14, the selector button 154 is moved to the high position thereof exhausting line R and pressurizing line F from the supply at valve 160. Thereafter, if the preselect prohibit release switch 178 is actuated, line C will be pressurized causing preselect prohibit valve 164 to place line F in communication with line G and blocking line G from fluid communication with line 3. Pressurization of line G will cause the preselect valve 168 to replace line 3 in fluid communication with the source of supply constantly pressurized line 1 and block line 3 from exhaust. Once pressurized, line 3 will remain pressurized regardless of the position of selector button 154 until such time as the selector button 154 is moved to the "Low" or "Intermediate" position thereof and the preselect prohibit release switch 172 is actuated pressurizing line C.

Although both preselect valves 166 and 168 are illustrated as not utilizing a biasing spring, a small biasing spring may be provided to urge the pistons 242 and 262 leftwardly. This is because the tapered area acted upon by pressure from the supply source is approximately of one-third the area as the surface area acted upon by preselect pilot lines D or G of pusher pistons 246 or 266.

It is understood, that although the auxiliary transmission 14 is illustrated as a direct drive type transmission wherein high speed operation is achieved by leftward movement of piston 144, low speed operation is achieved by leftward movement of piston 150 and intermediate speed operation is achieved by rightward movement of piston 150, other gearing structures and/or shift piston arrangements may require other movements of the pistons 144 and 150 and other arrangements of valve 160 as to position of selector button 154 and/or additional means to vary the pressurization and venting of lines R and F in response to movement of the selector button 154. It is also understood that the selector switch 172 although preferably associated with a partial movement of the clutch pedal may be modified to require full depression of the clutch pedal or may be placed at any other convenient location for selective operation by the vehicle operator. It is also understood that the shift control system of the present invention may be utilized to control the main section of a compound transmission and/or a simple transmission of any type including multi-speed transfer cases and the like.

It is also understood that although the present invention is illustrated as a pressurized fluid actuated control system, the present invention is equally applicable to control systems of the electric, fluid pressure, and/or mechanically actuated types.

In view of the above, it may be seen that a shift control system for a remotely controlled preselectable change gear transmission has been provided which will allow the operator to preselect a gear change but which will maintain the transmission in the currently engaged gear until such time as an operator actuated switch is actuated, thus avoiding the possibility of the occurrence of an unexpected preselected gear change occurring.

Although this invention has been described in its preferred form with a certain degree of particularity, it is understood that the present disclosure of the preferred form is for descriptive purposes only and that various modification and changes in the detailed construction and arrangement of the parts may be resorted to without departing from the spirit and the scope of the invention as hereinafter claimed.

I claim:

1. A control system for a multi-speed change gear transmission of the type permitting preselection of a gear change to be executed immediately upon achievement of enabling transmission operating conditions, said control system comprising;

a source of pressurized fluid;

an operator actuated gear selection valve movable to a plurality of positions to preselect a desired engaged gear in said transmission, said selector valve connected to said source of pressurized fluid and effective in one position thereof to connect said source of fluid to a first fluid conduit and in at least another position thereof to block said source of pressurized fluid and to connect said first conduit to exhaust;

at least one three way-two position preselect prohibit valve, said preselect prohibit valve having a first port therein connected to said first conduit, a second port connected to a second conduit and a third port connected to a third conduit, said prohibit valve including a valve member slidable therein and biased to a first position for blocking said first port and establishing fluid communication between said second and third port and movable against said bias to a second position for blocking said third port and establishing fluid communication between said first and second ports to place said first and second conduits in fluid communication, said prohibit valve including a first pilot port connected to a pilot conduit, pressurization of said pilot conduit effective to move said valve member from said first to said second position;

at least one three way-two position preselect valve, said preselect valve having a fourth port connected to a fourth conduit in constant communication with said source of pressurized fluid, a fifth port connected to said third conduit and a sixth port connected to a sixth conduit constantly connected to an exhaust, said preselect valve having a first position for blocking said fourth port to block communication between said constantly pressurized fourth conduit and said third conduit and establishing fluid communication between said fifth port and said sixth port to exhaust said third conduit and a second position for blocking said sixth port to block fluid communication between said third conduit and said exhaust and for establishing fluid communication between said fourth port and said fifth port to establish fluid communication between said constantly pressurized fourth conduit and said third conduit, said preselect valve having a second pilot port connected to said second conduit, pressurization of said second conduit effective to move said valve member to said second position thereof to pressurize said third conduit from said constantly pressurized fourth conduit;

an actuation valve having at least one shift piston therein connected to means for shifting said transmission, said piston having a first face acted upon by pressure in said constantly pressurized fourth conduit and an opposed larger second face acted upon by pressure in said third conduit whereby pressurization and exhaust of said third conduit will cause said piston to move to a first and second, respectively, operating positions; and an operator actuated preselect prohibit release switch valve, said preselect prohibit release switch valve having a seventh port connected to said source of pressurized fluid, an eighth port connected to an exhaust conduit and a ninth port connected to said pilot conduit, said preselect prohibit valve biased to block said seventh port and establish fluid communication between said eighth and ninth ports to exhaust said pilot conduit and movable upon actuation thereof to block said eighth port and establish fluid communication between said seventh and ninth ports to pressurize said pilot conduit.

2. The control system of claim 1 wherein said change gear transmission comprises a compound transmission consisting of a main transmission section connected in series with a splitter type auxiliary transmission section, said control system utilized to shift said auxiliary transmission section.

3. The control system of claim 2 wherein said main transmission section is shifted by means of a shift lever and said operator actuated gear selector valve is mounted to said shift lever.

4. The control system of claim 3 wherein said shift lever includes a shift knob, said operator actuated selector valve located in the shift knob.

5. A control system for a change gear transmission having at least three engagable speeds of the type permitting preselection of a gear change to be executed immediately upon achievement of enabling transmission operating conditions, said control system comprising;

an operator actuated gear selector valve having a selector switch movable to at least three positions to preselect a desired engaged gear, said selector switch connected to a source of pressurized fluid, a first signal conduit, a second signal conduit, and an exhaust conduit, in said first position said selector valve establishing communication between said source and said first signal conduit and exhausting said second signal conduit, in said second position said selector valve exhausting both of said first and second signal conduits and blocking source and in said third position connecting said second signal conduit to said source of pressurized fluid and exhausting said first signal conduit;

a first three way-two position preselect prohibit valve, said first preselect prohibit valve having a first inlet port connected to said first signal conduit, a first preselect pilot port connected to a first preselect pilot conduit, a first pressure line port connected to a first pressure line conduit and a first prohibit release port connected to a prohibit release conduit, said first prohibit valve including a first valve member therein biased to a first position for blocking said first inlet port and establishing fluid communication between said first preselect pilot port and said first pressure line port to establish fluid communication between said first preselect pilot conduit and said first pressure line conduit, pressurization of said first prohibit release conduit effective to move said first valve member to a second position thereof to block said first pressure line port and establish fluid communication between said first inlet port and said first preselect pilot port to establish fluid communication between said first signal conduit and said first preselect pilot conduit;

a second three way-two position preselect prohibit valve having a second inlet port connected to said second signal conduit, a second preselect pilot port connected to a second preselect pilot conduit, a second pressure line port connected to a second pressure line conduit and a second prohibit release port connected to said prohibit release conduit, said second prohibit valve having a second valve member therein biased to a first position for blocking said second inlet port and establishing fluid communication between said second preselect pilot port and said second pressure line port for establishing fluid communication between said second preselect pilot conduit and said second pressure line conduit, pressurization of said second prohibit release conduit effective to move said second valve member to said second position thereof for blocking said second pressure line port and establishing fluid communication between said second inlet port and said second preselect pilot port to establish fluid communication between said second signal conduit and said second preselect pilot conduit;

a first three way-two position preselect valve having a second preselect pilot port connected to said first preselect pilot conduit, a first exhaust port connected to an exhaust conduit, a second pressure line port connected to said first pressure line conduit and a first supply port connected to a supply conduit constantly pressurized from said source of pressurized fluid, said first preselect valve having a third valve member therein having a first position for connecting said second pressure line port to said first exhaust port for exhausting said first pressure line conduit and a second position for blocking said first exhaust port and connecting said first supply port to said second pressure line port to pressurize said first pressure line conduit from said supply conduit, said third valve member moved to said second position thereof in response to pressurization of said first preselect pilot conduit;

a second three way-two position preselect valve having a third preselect pilot port connected to said second preselect pilot conduit, a second exhaust port connected to an exhaust conduit, a third pressure line port connected to said second pressure line conduit and a second supply port connected to said supply conduit constantly pressurized from said source of pressurized fluid, said second preselect valve having a fourth valve member therein having a first position blocking said second supply port and establishing fluid communication between said third pressure line port and said second exhaust port to exhaust said second pressure line conduit and a second position for blocking said second exhaust port and establishing fluid communication between said third pressure line port and said second supply port for pressurizing said second pressure line conduit, said fourth valve member moved to the second position thereof upon pressurization of said second preselect pilot conduit;

an actuator valve assembly having a third supply port connected to said supply conduit constantly pressurized from said source of pressurized fluid, a fourth pressure line port connected to said first pressure line conduit and a fifth pressure line port connected to said second pressure line conduit, said actuator valve assembly including piston means having a first position for engagement of a first selected gear, a second position for engagement of a second selected gear and a third position for engagement of a third selected gear, said piston means assuming said first position upon pressurization of said first pressure line conduit and exhaust of said second pressure line conduit, said piston means assuming said second position upon exhaust of both of said first and second pressure line conduits and said piston means assuming said third position thereof upon pressurization of said second pressure line conduit and exhaust of said first pressure line conduit; and an operator actuated three way-two position preselect prohibit release valve having a third inlet port connected to said source of pressurized fluid, a third exhaust port connected to an exhaust conduit and a preselect prohibit release port connected to said prohibit release conduit, said prohibit release valve having a fifth valve member therein biased to a first position blocking said third inlet port and establishing fluid communication between said third exhaust port and said preselect prohibit release port for exhausting said prohibit release conduit, said valve member movable by operator actuation to said second position thereof for blocking said third exhaust port and establishing fluid communication between said third inlet port and said preselect prohibit release port for pressurizing said prohibit release conduit.

6. The control system of claim 5 wherein said change gear transmission comprises a compound transmission having a main transmission section connected in series with a splitter type auxiliary transmission section, said control system operating said auxiliary transmission section.

7. The control system of claim 6 wherein said main transmission system is shifted by a shift lever and said operator actuated selector valve is located at the shift knob of said shift lever.

8. The control system of claim 7 wherein said operator actuated preselect prohibit release valve is moved to said second position thereof upon operator operation of a master clutch control means.

9. The control system of claim 8 wherein said master clutch control means comprises a clutch pedal.

10. The transmission of claim 9 wherein said release means is operated by depression of the vehicle clutch pedal.

* * * * *